United States Patent
Pickerrell et al.

[11] Patent Number: 5,810,050
[45] Date of Patent: Sep. 22, 1998

[54] BALL VALVE FAUCET WITH IMPROVED FLOW CHARACTERISTICS AND HANDLE OPERATION

[75] Inventors: Daniel A. Pickerrell, Fishers; Larry Shock, Franklin, both of Ind.

[73] Assignee: Masco Corporation Of Indiana, Indianapolis, Ind.

[21] Appl. No.: 729,846

[22] Filed: Oct. 15, 1996

Related U.S. Application Data

[60] Provisional application No. 60/006,418, Nov. 9, 1995.

[51] Int. Cl.$^6$ .................................................. F16K 11/076
[52] U.S. Cl. .................................... 137/625.41; 137/625.4
[58] Field of Search ............................. 137/625.41, 625.4

[56] References Cited

U.S. PATENT DOCUMENTS

| | | |
|---|---|---|
| 2,592,062 | 4/1952 | Perry . |
| 3,056,418 | 10/1962 | Adams et al. . |
| 3,747,641 | 7/1973 | Hare et al. ........................ 137/625.41 |
| 3,915,195 | 10/1975 | Manoogian et al. ............... 137/625.41 |
| 4,043,359 | 8/1977 | Christo . |
| 4,505,301 | 3/1985 | Yang . |
| 5,040,566 | 8/1991 | Orlandi . |
| 5,469,889 | 11/1995 | Tang ................................... 137/625.41 |

*Primary Examiner*—John Fox
*Attorney, Agent, or Firm*—Reising, Ethington, Learman & McCulloch

[57] ABSTRACT

A single handle ball valve faucet (10) having a ball valve element (24) mounted in the housing (12) such that the handle lever (82) is moved to a rearward and up position to place the ball valve in an off position and to an easily accessible forward and down position to place the ball valve element (24) to an on position. A control plate (50) has a control opening (70) with a rearward facing apex 72 for receiving the control stem (80) of the ball valve when in the off condition and a wide forward edge (74) for allowing lateral motion of the stem (20) therealong for adjusting temperature mix of the water when the ball valve element (24) in the full flow on condition.

5 Claims, 2 Drawing Sheets

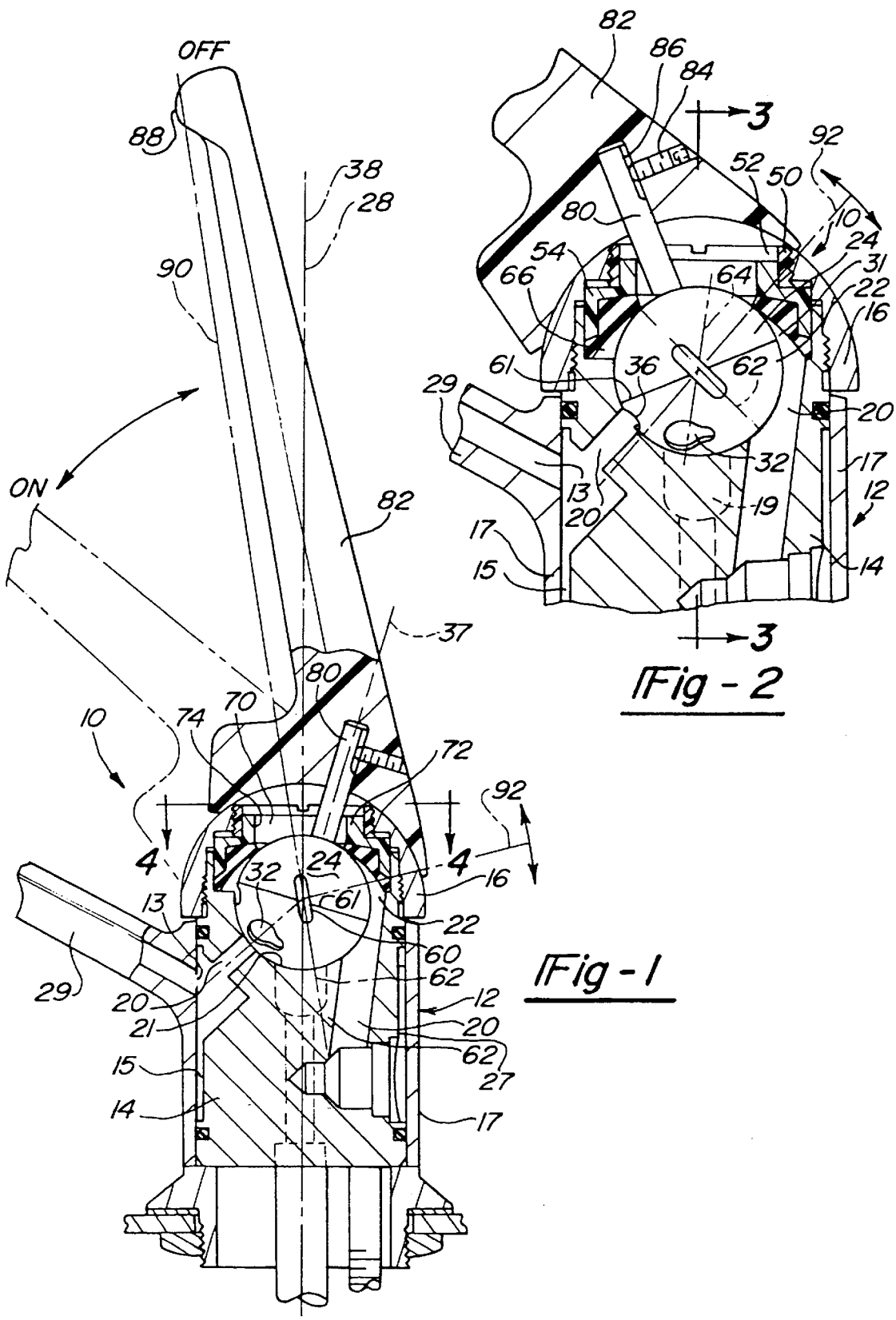

BALL VALVE FAUCET WITH IMPROVED FLOW CHARACTERISTICS AND HANDLE OPERATION

This application claims the benefit of U.S. provisional application Ser. No. 60/006,418, filed Nov. 9, 1995.

TECHNICAL FIELD

The field of this invention relates to a ball valve faucet and more particularly to a single handle mixing valve for a faucet.

BACKGROUND OF THE DISCLOSURE

Single handle faucets, commonly referred to as mixing valves, that control the flow of both hot and cold water have seen vast consumer acceptance. The faucets are commonly constructed such that a handle or knob is movable in two distinct directions to adjust the mix of hot and cold water and to adjust the volume or flow rate, i.e. flow. The handles are easily adjusted by manual grasping or by abutment of the side of an arm or elbow.

One basic type of mixer valve that has seen vast commercial acceptance is a ball valve. Ball valve mixing valves offer a reliable compact and durable construction. A desirable ball valve drive mechanism has the ball pivot about two axes. One axis is fixed with respect to the faucet body or housing and a second on the movable axis that is fixed relative to the ball. The movable axis is substantially perpendicular to the horizontal fixed axis. As the ball moves about the fixed axis, the movable axis of rotation pivots within a vertical plane about the fixed axis. An example of this type of ball drive mechanism is disclosed in U.S. Pat. No. 3,056,418 issued to Adams et al. on Oct. 2, 1962. This faucet discloses a handle that when moved to the forward and down position aligns the cylindrical inlet bores of the ball with the inlet ports of the valve body to allow flow of water through the inlet bores and to an outlet bore in the ball valve and out of the faucet. However, the control plate in the faucet is arranged with its control opening having an apex in the forward direction such that varying of the temperature at the full flow rate is impossible. Full flow rate is thus only at equal parts hot and cold water. The mixing of the water at other than equal portions of hot and cold water only occurs at partial flow conditions with less flow allowing greater temperature mixing between hot and cold water supplies. As with many plate valve faucets, this ball valve has temperature memory when in the off position such that temperature mix can be preset before the faucet is turned on.

Other faucet constructions based on the ball valve movements disclosed in the Adams patent have been developed and found commercial success. U.S. Pat. No. 4,043,359 to Christo discloses a ball valve having the same motion about two axis but with improved flow and mixing characteristics. The triangular control plate aperture of this faucet still has a forward apex facing forward toward the spout. However, the inlet openings in the ball element are positioned such that the faucet is in the off position when the handle is in the forward and down position and in the on position when lifted upwardly and rearwardly. When the handle is in the full on position, the control stem abuts against the wide rear linear edge of the triangular aperture. Lateral movement of the rearwardly positioned handle to the left or right adjusts the flow mix of the hot and cold water through the faucet. While this faucet provides temperature mixing of water at full flow conditions, the handle is in a rearward position which may be inconvenient by necessitating extra reach of several centimeters or inches for contact with the handle. This extra reach may place the handle out of reach for a child or for operators who have their hands occupied and want to use their elbows or arms to adjust the handle for temperature control. The inlet openings are substantially aligned with the same great circle of the ball valve element in which the control slot of the ball valve element lies. The fact that the slot and inlet openings are aligned along a single great circle, presents constraints and compromises as to how long the slot may be, how far the inlet openings may be separated from one another, and the specific contour of the inlet openings. These constraints adversely affect mixing profiles and comfort zones of the faucet.

What is needed is a ball valve mixing faucet that provides for handle motion that has an off position in the lifted rearward and upward position and a full on position in a forward and down position relative to the off position to provide ease in reaching the handle for mix control also while providing improved mixing characteristics at full and partial flow conditions.

SUMMARY OF THE DISCLOSURE

In accordance with one aspect of the invention, a faucet mixer valve for liquids has a ball valve element pivotably mounted in a cavity of a housing. The cavity is in fluid communication with a plurality of inlet ports and at least one outlet port. The ball valve has at least a partially spherical surface and a plurality of inlet openings in its surface. The openings cooperate with the inlet ports to control fluid flow in both flow rate and temperature mix of the incoming water. The valve housing has an access opening which houses a control plate that has a control opening therethrough. The ball valve has a control stem passing through the control opening. A handle is operably connectable to the stem. A sealing gasket is seated under the control plate and sealingly abuts against the movable ball valve element.

The control aperture in the control plate has a wide forward edge and a narrow rear apex. Openings in the ball valve element are arranged such that when rearward upward motion of the handle moves the stem to the rear apex, the ports in the housing and the openings in the ball valve element are completely misaligned and seals within the ports prevent any leakage of fluid through the faucet such that the faucet is in an off condition.

When the handle is moved forward and downward, the ports become aligned with at least one of the openings. When the stem abuts the front edge of the control aperture, the ports in the housing and openings in the ball element are aligned to allow maximum flow.

Temperature adjustment can be made during full flow when the handle is at the down and forward position. The handle extends forward toward the operator to be conveniently reached. The stem can be moved along the front edge from one end to the other which adjusts the temperature mix from full hot to full cold. Intermediate positions allow for intermediate mix temperatures between the full cold and full hot. Easy temperature mixing thereby occurs during full flow conditions while still maintaining a faucet structure that provides shutting off of the faucet by upward motion of the handle. In other words, forward and downward motion of the handle produces both full flow rate and easy temperature mixing occurs during full flow with the handle in an easy to reach forward position.

In one embodiment, the ball valve has a controlling control slot therethrough aligned substantially with a great circle of the ball. A pin is fixed in the base of the housing and extends through the slot of the ball. The ball valve is rotatable about a fixed axis of the pin at a point where the pin extends through the slot.

The slot is preferably contoured to follow a great circle on the ball valve that defines a plane that is in proximity to a distal end of a lever handle that is affixed to the control stem. The plane has a normal axis that is perpendicular to the pin such that the ball valve may move in two directions, one of the directions being about the fixed axis of the pin and a second direction being about the normal axis that moves with the ball valve element.

The openings are positioned symmetrically about the mid-plane for the right and left of the ball valve element and are mirror images of each other. The major portion of each inlet opening is positioned to the front side of the fore and aft plane of the ball valve that extends through the valve stem. Each inlet opening has a narrow end section that extends to the fore and aft plane. Two concave edges of each opening blend the narrow section with the major portion. The ends of the major and narrow sections each have convex edges.

The contour of the inlet openings in the ball valve element with the concave edges provides that the full flow rate is maintained approximately at a constant during motion of the stem along the front edge of the control opening from full cold to full hot and through all the intermediate mixing positions. Because the inlet openings are spaced laterally away from the constraining control slot, compromises that have been previously needed in the shape of the inlet openings are eliminated. The contoured edges of the inlet openings promote a wide comfort zone in proximity to the intermediate middle position of the faucet stem along the front edge of the control opening. The constant rate at full flow for different temperature mixes and a wide comfort zone is accomplished by the combination of the wide front edge and specifically shaped contour edges of the inlet openings.

BRIEF DESCRIPTION OF THE DRAWINGS

Reference now is made to the accompanying drawings in which:

FIG. 1 is a side elevational and segmented view of a water mixing valve in accordance to one embodiment of the invention showing the valve in the off position;

FIG. 2 is an enlarged fragmentary view similar to FIG. 1 showing the valve in the full on and mix position;

DETAILED DESCRIPTION OF THE PREFERRED EMBODIMENT

Figure 3:
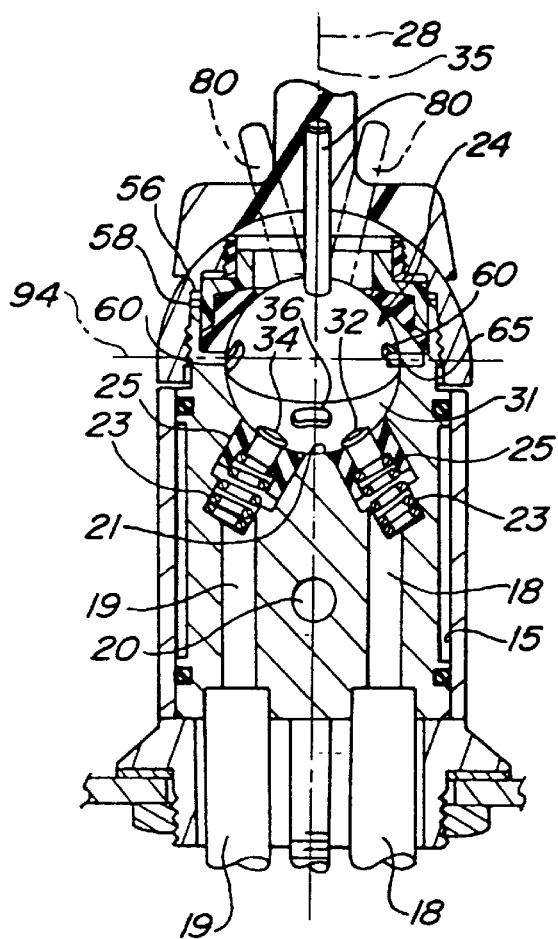
FIG. 3 is a partially segmented view taken along line 3—3 shown in FIG. 2.

Referring now to FIGS. 1–3, a mixing valve 10 has a conventional valve housing 12 that is formed from a housing base member 14 and a closure cap member 16 that is threaded onto the base member 14. The base member 14 has a cavity 22 formed therein with a substantially semi-spherical lower surface 21. Two inlet ports 18 and 19 for cold and hot water have downstream ends counter bored into the lower surface 21 to form a seat for two biasing springs 23 which bias tubular elastomeric sealing elements 25 against a ball valve element 24. The ports 18 and 19 are located substantially along,the midplane 38 for the fore and aft of the faucet that contains vertical longitudinal axis 28. Outlet passages 20 extend from the lower surface 21 and through a side cylindrical wall 27 of base 14 for the passage of mixed water from cavity 22. The outlet passages 20 are located substantially along the mid plane 35 for the right and left of the faucet.

A conventional tubular escutcheon shell 17 is sealingly and slidably mounted about the lower base member 14 and forms an annular chamber 15 in fluid communication with the outlet passage 20. A spout 29 is affixed to the escutcheon shell and in fluid communication with the annular chamber 15 through aperture 13 in shell 17.

Figure 5:
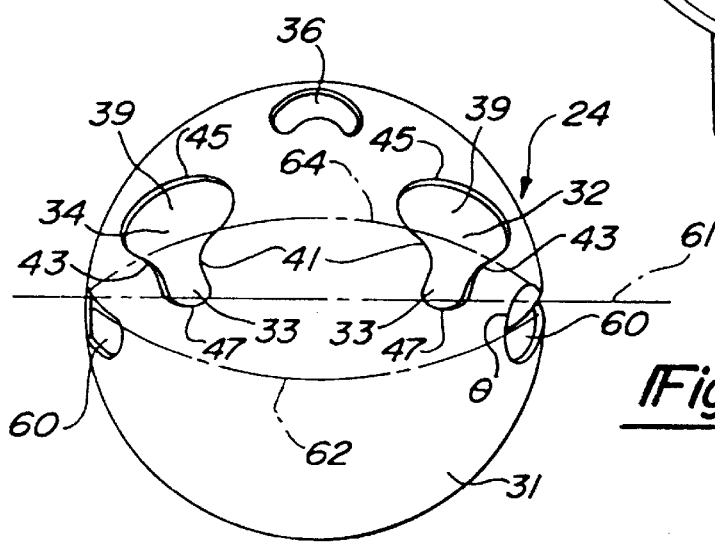
FIG. 5 is a view of the ball element shown in FIG. 1 clearly illustrating the shape and positions of the slots and the inlet and outlet openings in the ball valve element.

The ball valve element 24 as clearly shown in FIG. 5 has a substantially spherical valve surface 31 with an appropriately shaped and positioned cold inlet opening 32, hot inlet opening 34, and outlet opening 36 therethrough. The shape of the surface 31 substantially complements the concave shape of the lower surface 21 of cavity 22. The openings 32 and 34 cooperate with the respective inlet ports 18 and 19. Outlet opening 36 is in fluid connection with outlet passage 20 to regulate the mixture ratio of water and flow rate, i.e. volume of total water per unit time from the two inlet ports 18 and 19 to the outlet passage 20. Openings 32 and 34 are positioned symmetrically about the mid-plane 35 for the right and left of the ball valve element 24 when the ball valve is in the mid temperature position as shown in the figures. The opening 32 and 34 are mirror images of each other thus each respective section of each opening is similarly numbered. The major portion 39 of each inlet opening 32 and 34 is positioned to the front side of the fore and aft plane 37 of the ball valve the passes through the stem 80 as shown in FIG. 1. Each inlet opening 32 and 34 has a narrow end section 33 that extends to the fore and aft plane 37. Two concave edges 41 and 43 smoothly blend the narrow section 33 with the major portion 39. The ends of the major and narrow sections each have respective convex edges 45 and 47.

The ball valve element 24 also has at least one slot 60 arcing about the valving surface 31 of the ball valve 24 as clearly shown in FIGS. 1 and 2. The slot 60 is generally located at a left and or right side of the ball with a central longitudinal axis that forms part of a great circle 62 about the ball valve which lies in an angle of at least 45° and preferably approximately 60° with respect to a great circle 64 that intersect the center portion of the inlet openings 32 and 34. The angle is shown in FIG. 5 as "θ". Desirably the two described great circles intersect at the equator 61 of the ball valve element 24.

A cylindrical shaft referred to as a pin 65 is fixed in the base 14 and extends through the slot 60. The pin 65 and slot 60 are sized to slidably fit to provide limited rotation about movable axis 92 as shown in FIGS. 1 and 2 and be rotatable to provide rotation about the fixed horizontal axis 94 of the pin as shown in FIG. 3 but prevent any significant rotation of the ball valve with respect to the pin along the direction that is commonly referred to as the width of the slot. The slot 60 has a width to form only enough clearance to allow sliding movement of the pin 65 in slot 60. Desirably no lateral spacing exists between the slot 60 and the pin 65.

The cap member 16 has a threaded access opening 50 therethrough. An adjustment ring 52 is threadably engaged to the central access opening 50 for relative vertical adjustment thereto. A control opening member 54 is keyed in place via key 56 into a complementary notch 58 of base member 14. A sealing gasket 66 is seated under the control plate member 54 and in turn bears on the ball valve surface 31 to provide a fluid seal therebetween. Wear on the seal gasket 66 can be compensated by appropriate adjustment to the adjustment ring 52 which can be threaded downward into the central access opening 40 to press member 54 downwardly. Alternatively, the pin 65 can extend across the entire ball and extend through both slots 60. The ball can be supported with a device as disclosed in PCT publication WO 96/24793 and incorporated herein by reference.

Figure 4:
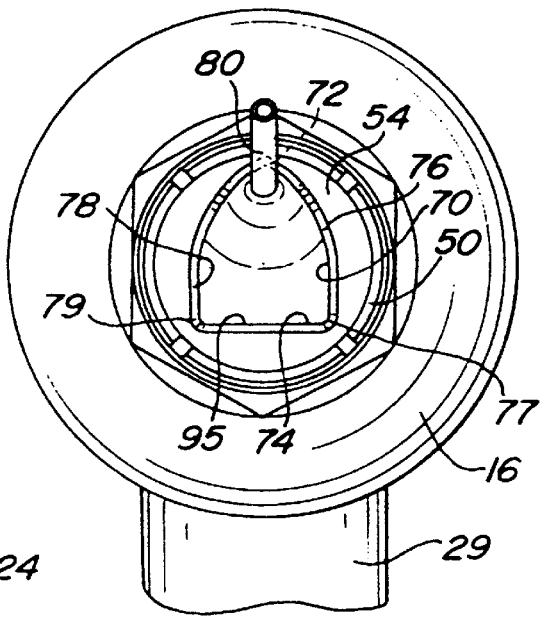
FIG. 4 is a top plan view taken along line 4—4 shown in FIG. 3 clearly illustrating the control plate and aperture.

As clearly shown in FIG. 4, a control opening 70 extends through the control plate 54. The opening 70 is generally shaped as a triangle. The triangular opening 70 is positioned such that a close or shut off position apex 72 points generally toward the back of the faucet. A mixing full flow edge 74 laterally extends across and generally in the front of the control opening 70. Two canted and possibly curved side edges 76 and 78 extend from the rear apex 72 to ends 77 and 79 of the full flow front edge 74.

The control stem 80 is fixedly connected to the ball valve element 24. The control stem 80 extends through the central access opening 40 and through the control opening 70 aligned along plane 37. The control stem 80 is constructed to be affixed to a faucet lever handle 82 in a conventional fashion via a set screw 84 passing through the handle 82 and abutting a flat 86 in the stem 80. The distal end 88 of the handle 80 is in proximity to and crosses a fore and aft plane 90 that contains the great circle 62 of the slot 60. The plane 90 is orthogonal to the movable axis of rotation 92 that adjusts the temperature mix of the valve.

Manual manipulation of the handle 82 can control the flow rate and the temperature mix of the water. Motion of the handle to the rearward up position as shown in FIG. 1 provides that the stem 80 is positioned at the rear apex 72. In this rear position the inlets openings 32 and 34 are completely misaligned from the inlet ports 18 and 19 and the faucet is shut off with seals 25 abutting against the valving surface 31 and preventing leakage. The handle can be rocked or pivoted forward and downward in any manner until the stem 80 abuts the front edge 74 of control opening 70 as shown in FIG. 2. At this point the inlet openings 32 and 34 are aligned over the ports 18 and 19 and flow is at a maximum. Of course the handle can be positioned at any point therebetween for any desired partial flow condition.

Temperature adjustment can be made during full flow when the handle is at the conveniently located down and forward position as shown in phantom in FIG. 1 and in FIG. 2. The stem can be moved along front edge 74 to any point from the central mix position as shown at point 95 to either end 77 or 79 which changes the temperature mix to either full hot or cold respectively. Temperature adjustment of the water supply from full cold to full hot is accomplished by placing the wide edge 74 of the triangular control opening 70 at the front side of the opening 70 and still maintain the closing of the faucet by upward motion of the handle. In other words, forward and downward motion of the handle can produce both full flow rate. The handle is in a forward position to allow convenient and easy access thereto for easy temperature mixing during partial and full flow conditions. The handle is merely moved left or right by the operator to obtain the desired temperature mix. The forwardly positioned handle can be conveniently searched by a person's elbow to be pulled left or right for easy temperature adjustment.

The contour of the inlet openings 32 and 34 with the contour edges provides that the full flow rate is maintained approximately at a constant during motion of the stem along the front edge 74 from full cold to full hot and through all the intermediate mixing positions. Furthermore, the contoured edges 41 and 43 promote a wider comfort zone in proximity to the intermediate middle position 94 of the faucet stem along the front edge 74 of the control opening. This constant rate at full flow at different temperature mixes and a wider comfort zone is accomplished by the combination of the wide front edge 74 in combination with the specifically shaped contour edges 41 and 43 of the inlet openings 32 and 34.

The positioning of the inlets along great circle 64 which is substantially angled with respect to great circle 62 of slot 60 provides for much greater freedom of inlet contours of any desired mixing profile without the need for compromises due to working about slot 60. As such, wider comfort zones are available which are particularly desirable for shower valves.

Other variations and modifications are possible without departing from the scope and spirit of the present invention.

The embodiments in which an exclusive property or privilege is claimed are defined as follows:

1. A faucet mixing valve comprising:

a housing, said housing having a cavity, said housing having at least one inlet port and at least one outlet port, said inlet port and outlet port being in fluid communication with said cavity;

a ball valve element pivotally mounted in said cavity, said ball valve element having at least a partially spherical surface, said surface having a plurality of inlet openings, and an outlet opening said inlet openings in said surface of said ball valve cooperating with respective inlet and outlet ports for selective fluid communication between said openings and said ports;

a control stem operatively attached to said ball valve and extending outward therefrom;

a handle having a base portion and a distal end, said base portion being operatively attached to said control stem and said distal end extending forward toward an operator from said base portion;

an access opening in said housing to provide access to said ball valve element mounted in said cavity;

a control plate mounted in said access opening, said control plate having a control opening there-through through which said control stem passes, said control opening having a wide forward edge and a narrow rear apex;

a seal disposed between said control plate and the movable ball valve element;

a spout operatively attached to said housing, said spout having an opening in fluid communication with said outlet port of said housing to allow flow of fluid from said faucet to a basin; said spout being oriented in a forward position from said housing;

said faucet mixing valve being in the off position with said stem abutting said narrow rear apex of said control opening and said base portion of said handle being oriented in a rearward lifted position while said distal end of said handle is oriented in a first position that is in an upward lifted direction; and said faucet mixing valve being in a full-flow-on position with said stem abutting said wide forward edge of said control opening and being able to move the handle from side to side in the full-flow-on position to adjust the temperature while in the full-flow-on position and said base portion of said handle being oriented in a forward position while said distal end of said handle being oriented in a second position that is in a lowered forward direction relative to said first position.

2. A faucet mixing valve as defined in claim 1 further comprising said inlet openings being symmetrically positioned about a mid-plane for a right side and a left side of said ball valve element so that said right and said left sides are mirror images of each other.

3. A faucet valve as defined in claim 2 further comprising said inlet openings having a major portion located on the front side of a center fore-aft plane of the faucet, a narrow end section that extends to the fore-aft plane, and at least two concave edges which blend said major portion with said narrow end section.

4. A faucet mixing valve as defined in claim 3 further comprising said major portions and said narrow end sections having convex edges.

5. A faucet mixing valve as defined in claim 1 further comprising:

said ball valve having a slot co-aligned substantially with a great circle of said ball valve; and said housing having a base, said base having a pin operatively attached thereto, said pin extending through said slot of said ball valve element, said ball valve element being rotatable about an axis of said pin where the pin extends through said slot.

\* \* \* \* \*